(12) United States Patent
Herman

(10) Patent No.: US 7,376,780 B2
(45) Date of Patent: May 20, 2008

(54) PROTOCOL CONVERTER TO ACCESS AHB SLAVE DEVICES USING THE MDIO PROTOCOL

(75) Inventor: Philip W. Herman, Carlisle, MA (US)

(73) Assignee: LSI Corporation, Milpitas, CA (US)

( * ) Notice: Subject to any disclaimer, the term of this patent is extended or adjusted under 35 U.S.C. 154(b) by 214 days.

(21) Appl. No.: 11/263,514

(22) Filed: Oct. 31, 2005

(65) Prior Publication Data

US 2007/0101043 A1    May 3, 2007

(51) Int. Cl.
G06F 13/36 (2006.01)
G06F 13/40 (2006.01)
G06F 13/12 (2006.01)
G06F 13/42 (2006.01)
G06F 13/20 (2006.01)

(52) U.S. Cl. .................. 710/315; 710/66; 710/71; 710/307

(58) Field of Classification Search .......... 710/66, 710/71, 307, 315
See application file for complete search history.

(56) References Cited

U.S. PATENT DOCUMENTS

| | | | | |
|---|---|---|---|---|
| 4,447,878 A | * | 5/1984 | Kinnie et al. | 710/307 |
| 4,831,514 A | * | 5/1989 | Turlakov et al. | 710/66 |
| 7,185,134 B2 | * | 2/2007 | Kim et al. | 710/313 |
| 2003/0140187 A1 | * | 7/2003 | Moriwaki et al. | 710/74 |
| 2003/0200374 A1 | * | 10/2003 | Moriwaki et al. | 710/305 |
| 2005/0188144 A1 | * | 8/2005 | Park et al. | 710/315 |
| 2005/0204084 A1 | * | 9/2005 | Joe et al. | 710/113 |

OTHER PUBLICATIONS

ARM Limited; "AMBA Specification"; ARM Limited; Revision 2.0; May 13, 1999; all pages.*

* cited by examiner

*Primary Examiner*—Paul R. Myers
*Assistant Examiner*—Ryan M Stiglic
(74) *Attorney, Agent, or Firm*—Christopher P. Maiorana, P.C.

(57) ABSTRACT

A method for communicating between a first bus and a second bus is disclosed. The method generally includes the steps of (A) recognizing a read operation code in a read frame (i) received from the first bus and (ii) communicated with a first-bus protocol, (B) initiating a read transaction on the second bus using a second-bus protocol different than the first-bus protocol, wherein the initiating occurs earlier than a turn around time in the first-bus protocol that provides a plurality of bit times to respond to the read operation code and (C) transmitting read data received from the second bus on the first bus immediately after the turn around time.

22 Claims, 4 Drawing Sheets

TABLE I

| FRAME | PRE | ST | OP | REGADR | PHYADR | TA | ADDRESS / DATA | IDLE |
|---|---|---|---|---|---|---|---|---|
| | | | | MANAGEMENT FRAME FIELDS | | | | |
| ADDRESS | 1...1 | 00 | 00 | PPPPP | EEEEE | 10 | AAAAAAAAAAAAAAAA | Z |
| WRITE | 1...1 | 00 | 01 | PPPPP | EEEEE | 10 | DDDDDDDDDDDDDDDD | Z |
| READ | 1...1 | 00 | 11 | PPPPP | EEEEE | Z0 | DDDDDDDDDDDDDDDD | Z |
| READ-INCREMENT | 1...1 | 00 | 10 | PPPPP | EEEEE | Z0 | DDDDDDDDDDDDDDDD | Z |

FIG. 3

PROTOCOL CONVERTER TO ACCESS AHB SLAVE DEVICES USING THE MDIO PROTOCOL

FIELD OF THE INVENTION

The present invention relates to bus bridges generally and, more particularly, to a protocol converter to access Advanced High-performance Bus (AHB) slave devices using a Management Data Input/Output (MDIO) protocol.

BACKGROUND OF THE INVENTION

The Management Data Input/Output (MDIO) protocol is used in many devices, especially devices using various Ethernet type interfaces. An MDIO bus is a serial bus that can transfer a 16-bit address or a 16-bit data word per frame. The Advanced High-performance Bus (AHB) protocol is used by many peripherals. An AHB bus is a parallel bus that can transfer a 32-bit address and a 32-bit data word simultaneously. It would be desirable for an MDIO bus master to be able to communicate with an AHB slave device.

SUMMARY OF THE INVENTION

The present invention concerns a method for communicating between a first bus and a second bus. The method generally comprises the steps of (A) recognizing a read operation code in a read frame (i) received from the first bus and (ii) communicated with a first-bus protocol, (B) initiating a read transaction on the second bus using a second-bus protocol different than the first-bus protocol, wherein the initiating occurs earlier than a turn around time in the first-bus protocol that provides a plurality of bit times to respond to the read operation code and (C) transmitting read data received from the second bus on the first bus immediately after the turn around time.

The objects, features and advantages of the present invention include providing a protocol converter that may (i) enable an MDIO bus master to access AHB slave devices using an MDIO protocol, (ii) hide the latency of an AHB read transaction from the MDIO protocol, (iii) convert information between a serial protocol and a parallel protocol and/or (iv) provide compatibility with an AHB-lite specification.

BRIEF DESCRIPTION OF THE DRAWINGS

These and other objects, features and advantages of the present invention will be apparent from the following detailed description and the appended claims and drawings in which:

FIG. 3 is a TABLE I of the MDIO protocol; and

DETAILED DESCRIPTION OF THE PREFERRED EMBODIMENTS

Figure 1:
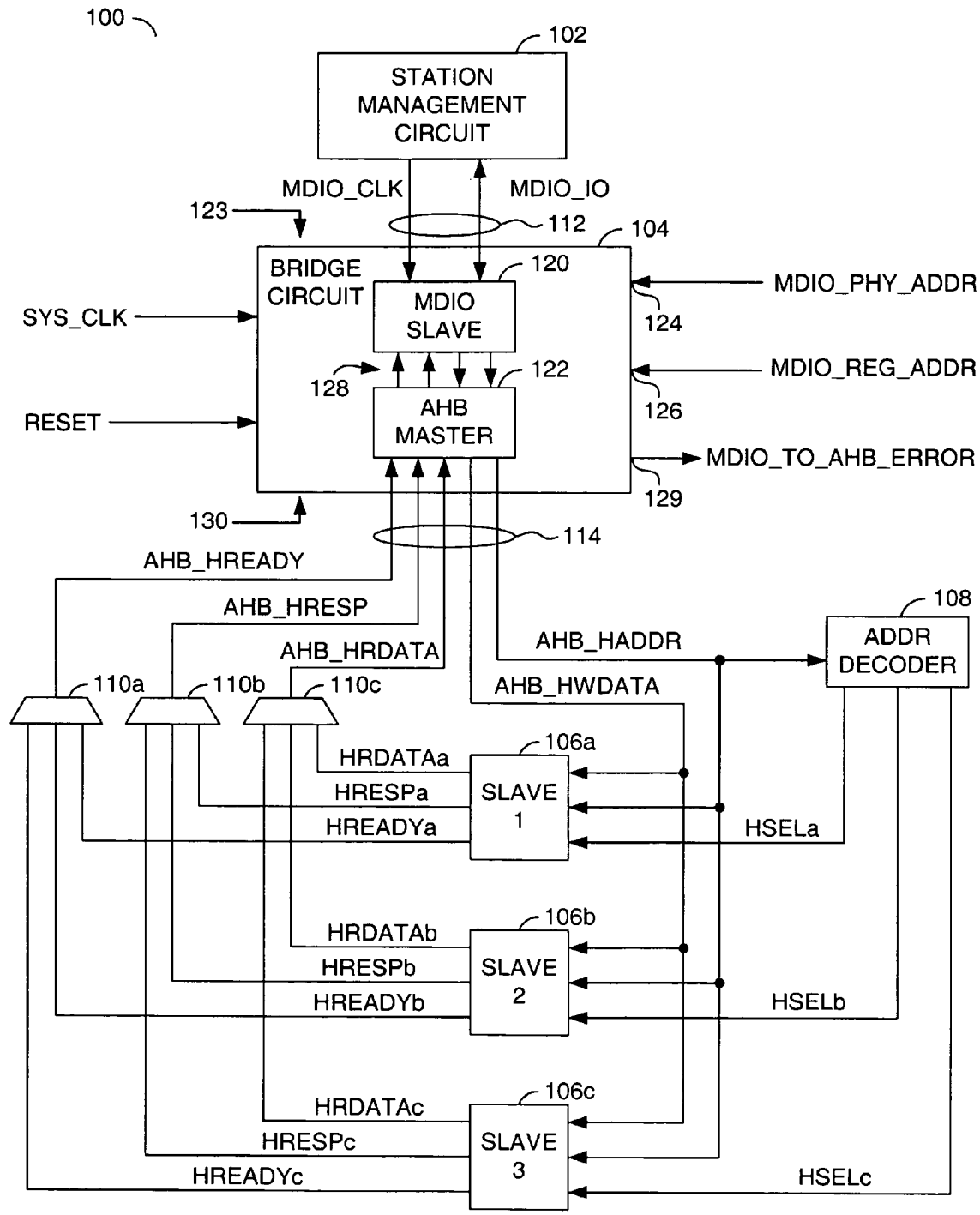
FIG. 1 is a block diagram of an example implementation of a system.

Referring to FIG. 1, a block diagram of an example implementation of a system 100 is shown. The system 100 generally comprises a circuit (or module) 102, a circuit (or module) 104, one or more circuits (or modules) 106a-106c, a circuit (or module) 108, multiple multiplexers 110a-110c, a bus 112 and a bus 114. The system (or apparatus) 100 may be implemented as a system-on-a-chip circuit. The system 100 may be operational to allow a Management Data Input/Output (MDIO)-based controller to read and write to/from devices that have Advanced High-performance Bus (AHB) interfaces.

The circuit 102 may be referred to as a Station Management (STA) circuit. The STA circuit 102 may be operational as a bus master for the bus 112. In one example, the bus 112 may be compliant with an Institute of Electrical and Electronics Engineering (IEEE) specification 802.3ae, clause 45, for an MDIO electrical interface. The bus 112 and the circuit 102 may be compliant with other serial bus standards to meet the criteria of a particular application.

The circuit 104 may be referred to as a bridge circuit. The bridge circuit 104 may be operational to translate messages and information between the MDIO bus 112 and the bus 114. The bus 114 may be compliant with an Advance High-performance Bus (AHB) of an Advanced Microcontroller Bus Architecture (AMBA) specification published by ARM Limited, Cambridge, England. In one example, the AHB bus 114 may be implemented as an AHB-lite bus. In other examples, the bus 114 and the circuit 104 may be compliant with other bus standards to meet the criteria of a particular application.

The circuits 106a-106c may be referred to as slave circuits (or devices). The slave circuits 106a-106c may be operational as slave devices on the AHB bus 114. Each of the slave devices 106a-106c may be readable and writeable via the AHB bus 114.

The circuit 108 may be referred to as an address decoder circuit. The address decoder circuit 108 may be operational to generate multiple select signals (e.g., HSELa-HSELc) based on an address value presented by the bridge circuit 104. A unique select signal HSELa-HSELc may be presented to each of the slave circuits 106a-106c indicating which of the slave devices 106a-106c is being addressed. In some designs, the address decoder circuit 108 may be eliminated (e.g., a design in which all of the slave circuits 106a-106c directly decode the address values to determine participation in bus transactions).

The multiplexers 110a-110c may be operational to multiplex a number of ready signals (e.g., HREADYa-HREADYc) into a ready signal (e.g., AHB_HREADY), a number of status response signals (e.g., HRESPa-HRESPc) into a status response signal (e.g., AHB_HRESP) and a number of read data signals (e.g., HRDATAa-HRDATAc) into a read data signal (e.g., AHB_HRDATA) from the slave circuits 106a-106c back to the bridge circuit 104. In certain applications, the multiplexers 110a-110c may be eliminated (e.g., in designs having a single slave circuit 106a).

The bridge circuit 104 generally comprises a module (or block) 120 and a module (or block) 122. The module 120 may be referred to as an MDIO interface module (also called MDIO_TO_AHB_MASTER.V). The module 122 may be referred to as an AHB master module. The MDIO module 120 may be operational to act as a slave device on the MDIO bus 112 at an MDIO slave interface 123. The MDIO module 120 may also communicate with the AHB master module 122. While communicating on the MDIO bus 112, the MDIO module 120 may support an MDIO clause 45 (e.g., ST=> '00'). In some applications, the MDIO module 120 may not support an MDIO clause 22 (e.g., ST=> '01').

The MDIO protocol clause 45 generally defines the following opcodes: (i) Address, saves a specified address, (ii). Write, writes a word to the specified address, (iii) Read, reads a word from the specified address and (iv) Read, Post Increment (e.g., Read-Increment), reads a word from the specified address and then increments the address. The address is generally incremented by two bytes (e.g., a 16-bit word) by the Read-Increment opcode.

The MDIO protocol may also define a port (or register) address field (e.g., REGADR) and a device (or physical) address field (e.g., PHYADR) that may be used to address the bridge circuit 104. A register address value in the field REGADR and a physical address value in the field PHYADR received from the MDIO bus 112 may be latched and compared with an assigned register address value in a signal (e.g., MDIO_REG_ADDR) and an assigned physical address value in a signal (e.g., MDIO_PHY_ADDR), respectively, received through external ports 124 and 126 of the bridge circuit 104. If both of the bus-received values match both of the assigned values, an internal match signal may be asserted by the bridge circuit 104 and the frame reception continued from the MDIO bus 112.

The AHB master module 122 may include an AHB cycle request interface 128 to the MDIO slave module 120 and an AHB-lite slave interface 130 to the slave circuit 106a-106c. The AHB master module 122 and the MDIO slave module 120 may exchange information (e.g., address, read data and write data) in multi-bit units (e.g., 16-bit words). The AHB master module 122 and the slave modules 106a-106c may exchange information (e.g., address, read data and write data) in wider multi-bit units (e.g., 32-bit double words). In some embodiments, the address information used on the AHB bus 114 may be 24-bit addresses. In other embodiments, the addresses used on the AHB bus 114 may be 16-bit values or 32-bit values. Since the slave circuits 106a-106c may send and receive data on double word boundaries (e.g., 4-byte boundaries), the lowest two bits in the AHB-bus address (e.g., AHB_HADDR[1:0]) may always be logical zeros. The AHB master module 122 may be responsible for enforcing the last two address bits as logical zeros regardless of what the MDIO slave module 120 provides. Therefore, the 16-bit MDIO addresses may be mapped directly into AHB addresses by dropping the least significant bit (e.g., a logical AND with a value 0xfffe) and shifting the bits left one place, as follows:

AHB_HADDR<=((MDIO_ADDR & 0xfffe)<<1)

The two least significant bits of the AHB address AHB_HADDR may be set to logical zeros. The unused upper bits of the AHB address AHB_HADDR may be padded with all logical zeros, all logical ones or some predetermined pattern.

Figure 2:
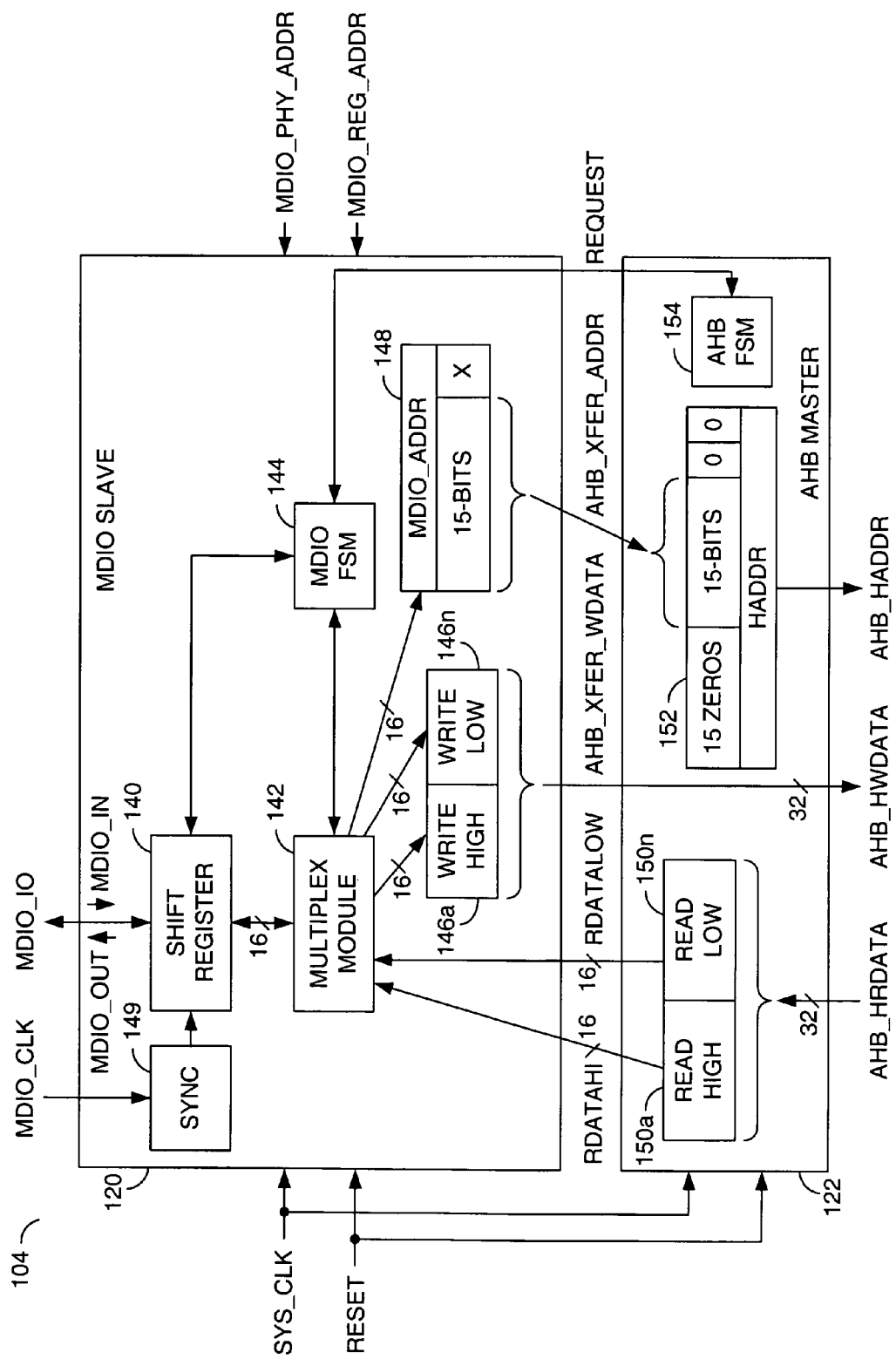
FIG. 2 is a block diagram of an example implementation of a bridge circuit of the system in accordance with a preferred embodiment of the present invention.

Referring to FIG. 2, a block diagram of an example implementation of the bridge circuit 104 is shown in accordance with a preferred embodiment of the present invention. The MDIO slave module 120 generally comprises a shift register 140, a multiplex module 142, a finite state machine 144, a number of write registers 146a-146n, an address register 148 and a synchronizer module 149.

The shift register 140 may be operational to send and receive data on the MDIO bus 112 in a signal (e.g., MDIO_IO). The data in the signal MDIO_IO may be synchronized to a clock signal (e.g., MDIO_CLK) as generated by the STA circuit 102. Information in the signal MDIO_IO may be valid on a rising edge of the clock signal MDIO_CLK and remain stable for a predetermined period afterwards. The clock signal MDIO_CLK may be synchronized to a system clock (e.g., SYS_CLK) by the synchronizer module 149 upon reception at the bridge circuit 104.

Operation of the synchronizer module 149 may slightly delay the rising edges and the falling edges of the signal MDIO_CLK. The delays may be insignificant compared with the time that the information in the signal MDIO_IO is valid and stable. As such, the information in the signal MDIO_IO may be in synchronization with the system clock domain. In general, the clock signal MDIO_CLK and the data signal MDIO_IO may be provided to the shift register 140 on separate wires. In some embodiments, separate shift registers may be used for input data and output data.

The MDIO finite state machine 144 may be operational to control the MDIO slave module 120 to act as a slave device on the MDIO bus 112. The MDIO finite state machine 144 may control the shift register 140 and the multiplex module 142 to direct data and address information. The MDIO finite state machine 144 may also communicate with the AHB master module 122. A person of ordinary skill in the art would understand how to create the MDIO finite state machine 144 to parse the MDIO frames.

The write registers 146a-146n may each be configured to store a single data element received from the MDIO bus 112. In one embodiment, the number of write registers 146a-146n may be two. However, additional write registers 146a-146n may be implemented to meet the criteria of a particular application. The address register 148 may be configured to store an address received from the MDIO bus 112.

The AHB master module 122 generally comprises multiple read registers 150a-150n, an address register 152 and a finite state machine 154. The read registers 150a-150n may be used to buffer read data received from one of the slave circuits 106a-106c until ready for transmission on the MDIO bus 112. In one example, the number of read registers 150-150n may be two. However, additional read registers 150a-150n may be implemented to meet the criteria of a particular application. The write data buffered in the write registers 146a-146n of the MDIO slave module 120 may be accessed by the AHB master module 122 when ready to write the data to one of the slave circuits 106a-106c.

The AHB finite state machine 154 may be operational to conduct both read transactions and write transactions on the AHB bus 114. The AHB finite state machine 154 may also be operational to communicate with the MDIO finite state machine 144. Communications between the finite state machines 144 and 154 may be used to coordinate flow of data items, address values and other information between the modules 120 and 122. A person of ordinary skill in the art would understand how to create the AHB finite state machine 154.

An address signal (e.g., AHB_XFER_ADDR) may be used to carry multi-bit (e.g., 16-bit) address values. The signal AHB_XFER_ADDR may present the address values from the MDIO address register 148 to the AHB address register 152, one address value at a time. A write data signal (e.g., AHB_XFER_WDATA) may be used to carry multi-bit (e.g., 32-bit) write data items. The signal AHB_XFER_WDATA may transfer the write data items from the write registers 146a-146n to the AHB master module 122, multiple write data times at a time in parallel. Multiple (e.g., two) read signals (e.g., RDATAHI and RDATALOW) may be received by the multiplex module 142 from the read registers 150a-150n. The signals RDATAHI and RDATALOW may present read data items from the read registers 150a-150n to the multiplex module 142, multiple read data items at a time in parallel. A request signal (e.g., REQUEST) may be presented between the MDIO finite state machine 144 and the AHB finite state machine 154. The signal REQUEST may transfer one or more different types of requests/information to the AHB finite state machine 154. Furthermore, the signal REQUEST may transfer one or more different types of requests to the MDIO finite state machine 148.

In one example, the write registers 146a-146n may each contain two data bytes (e.g., one word) of write data received from the MDIO bus 112. The write data may be written from the write registers 146a-146n over the AHB bus 114 to one of the slave circuits 106a-106c. Storing the multi-bit (e.g., 16-bit) data received from the MDIO bus 112 into one of the write registers 146a-146n may be controlled by one or more particular bits of the address value stored in the address register 148. In one example, a single particular address bit (e.g., MDIO_ADDR[0]) may be used to distinguish between a write high register 146a and a write low register 146b. For example, if the particular address bit in the address register 148 is a logical zero (e.g., X=0), the write data may be stored in the write low register 146b. If the particular address bit in the address register 148 is a logical one (e.g., X=1), the write data may be stored in the write high register 146a. In another example, the polarity of the particular address bit may be reversed. Therefore, a logical zero in the particular address bit may result in the write data being stored in the write high register 146a. A logical one in the particular address bit may result in the write data being stored in the write low register 146b.

Writing a low data word to the write low register 146b generally does not cause an AHB transfer. Writing a high data word to the write high register 146a may cause an AHB transfer to take place. Therefore, a wide (e.g., 32-bit) transfer on the AHB bus 114 may be accomplished by the STA circuit 102 sending the bridge circuit 104 (i) an address frame conveying an address value of the target slave circuit 106a-106c with the particular bit set to a logical zero, (ii) a write frame with the low data word, (iii) another address frame having the address value with the particular bit set to the logical one and (iv) another write frame carrying the high data word.

In another embodiment, the AHB bus 114 may be four times wider than the MDIO bus 112 (e.g., the AHB bus 114 has a 64-bit data path). To transfer 64 bits of write data, the STA circuit 102 may use two particular address bits to distinguish among the four 16-bit words of write data on the AHB bus 114. Therefore, the STA circuit 102 may generate additional address frames and additional write frames to move four 16-bit write data items to the bridge circuit 104 via the MDIO bus 112.

If the highest data word is written without the lower data word (or words) being previously written, an error is generally indicated by asserting an error signal (e.g., MDIO_TO_AHB_ERROR) at an output 129. The error signal may be cleared by (i) assertion of a reset signal (e.g., RESET) and/or (ii) writing a low data word. Other mechanisms may be implemented to clear the error signal MDIO_TO_AHB_ERROR to meet the criteria of a particular application.

Requesting a read generally causes an AHB read to take place. In one embodiment, if the particular address bit is set to "low" (e.g., MDIO_ADDR[0]=0), the low bytes of read data may be sampled from the read low register 150b and returned to the STA circuit 102 via the MDIO bus 112. If the particular address bit is set to "high" (e.g., MDIO_ADDR[0]=1), the high bytes of read data may be sampled from the read high register 150a and returned to the STA circuit 102 via the MDIO bus 112. In another embodiment, the polarity of the particular address bit may be reversed. As such, if the particular address bit is a logical zero, the read data from the read high register 150a may be sampled and returned. If the particular address bit is a logical one, the read data from the read low register 150b may be sampled and returned. The STA circuit 102 may command a read transaction on the AHB bus 114 by sending the bridge circuit 104 (i) a first address frame having an address value of the target slave circuit 106a-106c with the particular bit set to a logical zero, (ii) a read frame to return the low read data, (iii) a second address frame with the address value having the particular bit set to a logical one and (iv) another read frame to return the high read data.

In other embodiments, the AHB bus 114 may have a data path four time wider than the MDIO bus 112 (e.g., the AHB bus 114 may have a 64-bit data path). To transfer 64 bits of write data, the STA circuit 102 may use two particular address bits to distinguish among the four 16-bit words of read data on the AHB bus 114. Therefore, the STA circuit 102 may generate additional address frames and additional read frames to read four 16-bit write data items from the bridge circuit 104.

The AHB read transactions generally take place during a "turn around" time of the MDIO transfer protocol. The turn around time may provide a slave device (e.g., the MDIO slave module 120) on the MDIO bus 112 with one or more bit times of the clock signal MDIO_CLK to prepare the requested read data for transmission. In one example, the MDIO slave module 120 may have two bit times to prepare the requested read data. Whenever the clock speed of the AHB bus 114 is substantially more than an order of magnitude faster than the MDIO_CLK speed for the MDIO bus 112, sufficient time should be available to meet the turn around time criteria of two bit times. For example, an AHB bus clock speed at least 20 times faster than the MDIO_CLK speed generally allows read data to be moved from the slave circuits 106a-106c to the bridge circuit 104 before the MDIO read frame is ready to transfer the read data. If the read transfer does not take place in time, the error signal MDIO_TO_AHB_ERROR may be asserted.

Requesting a read-increment type of read transaction generally causes the address stored in the MDIO address register 148 to be incremented after the read data has been transferred on the MDIO bus 112. The address value increment generally results in the next several (e.g., two) read data bytes being referenced by a subsequent read frame on the MDIO bus 112. As such, the STA circuit 102 may command a read transaction by sending a sequence of (i) an address value having the particular bit set to access the low read data, (ii) a read-increment frame to return the low read data then incremented the address value and (iii) a read frame to return the high read data.

In one embodiment, the AHB bus 114 may have a data path four times wider than the MDIO bus 112 (e.g., the AHB bus 114 may have a 64-bit data path). Therefore, the STA circuit 102 may generate additional read-increment frames to return the additional read data items. For example, the STA circuit 102 may generate an address frame having two particular address bits pointing to a lowest word of a read data item. The STA circuit 102 may then generate three successive read-increment frames to read the three lowest words. Finally, the STA circuit 102 may generate a read frame to read the highest (e.g., fourth) word of the read data item.

The following AHB bus fields may be constrained for the system 100:

field TRANS=>NONSEQ (e.g., 2'b10) or IDLE
(e.g., 2'b00)

field HBURST=>SINGLE_XFER (e.g., 3'b000)

field HSIZE=>4-BYTES (e.g., 3'b010)

In other embodiments, the above fields may be constrained differently to meet the criteria of a particular application.

Both modules 120 and 122 generally use the signal SYS_CLK as a basic clock. The modules 120 and 122 may be reset by assertion (e.g., a low voltage) of the signal RESET. The signal RESET may be an asynchronous set (e.g., asserted) and a synchronous reset (e.g., deasserted). In other embodiments, the signal RESET may be synchronously set (e.g., asserted) in synchronization with the clock signal SYS_CLK.

The MDIO module 120 may use the clock signal MDIO_CLK to read the data signal MDIO_IO from the MDIO bus 112. In some embodiments, the clock signal MDIO_CLK may be implemented as a 2.5 MHz to 20 MHz clock. The shift register 140 may detect rising edges of the signal MDIO_CLK. The clock signal MDIO_CLK may also be used to control state transitions in the MDIO finite state machine 144.

Referring to FIG. 3, a TABLE I of the MDIO protocol is shown. The TABLE I generally illustrates support for the clause 45. The MDIO protocol may define multiple frame types (e.g., Address, Write, Read and Read-Increment). Each frame generally comprises a preamble (PRE) field, a start of frame (ST) field, an operation code (OP) field, the register address (REGADR) field, the physical address (PHYADR) field, the turn around time (TA) field, an address/data field and an idle field. The letters "PPPPP" generally represent a variable value in the physical address field PHYADR. The letters "EEEEE" generally represent a variable value in the register address field REGADR. The letters "AAA . . . AAA" may represent a variable address value in the address/data field. The letters "DDD . . . DDD" generally represent a variable data value (e.g., read or write) in the address/data field. The letter "Z" may indicate a tri-state high impedance value and/or a don't care bit in the frame.

The MDIO state machine 144 may be designed to walk thru the various states of an MDIO frame. The start of frame field ST bits in an MDIO frame should be '00' for the condition "CLAUSE_45_R" to be asserted. The operation code OP bits in the MDIO frame may shifted in by the shift register 140 and saved for later use. A physical (device) address value in the field PHYADR of the MDIO frame and a register (port) address value in the field REGADR of the MDIO frame may be compared with the assigned physical address value in the signal MDIO_PHY_ADDR and the assigned register address value in the signal MDIO_REG_ADDR. Matches generally indicate that the MDIO frame is intended for the bridge circuit 104. An internal start signal (e.g., AHB_XFER_REQUEST), which is a portion of the signal REQUEST, may be asserted to initiate a transfer assuming that "CLAUSE_45_R" is true and an the physical address and register address matches exist. In some embodiments, only the physical address value in the MDIO frame may be compared with the physical address value in the signal MDIO_PHY_ADDR. A match of the physical address and the physical address value in the signal MDIO_PHY_ADDR may indicate that the MDIO frame is destined for the bridge circuit 104. In other embodiments, only the register address value in the MDIO frame may be compared with the register address value in the signal MDIO_REG_ADDR. A match of the register address and the register address value in the signal MDIO_REG_ADDR may indicate that the MDIO frame is destined for the bridge circuit 104.

For an address cycle, the 16 address bits may be stored locally in the MDIO address register 148. For a write cycle, the particular address bit (e.g., MDIO_ADDR[0] bit) is generally used to store low write data (e.g., MDIO_ADDR[0]=0) and high write data (e.g., MDIO_ADDR[0]=1). After the high write data is written into the write high register 146a, an AHB write transfer may be initiated by the AHB master module 122 sending the contents of all of the write registers 146a-146n to the AHB bus 114.

For a read (or read-increment) cycle, the AHB read transfer is generally started at the beginning of the TA0 cycle of the MDIO protocol. Availability of the read data from the AHB master module 122 at the end of the TA1 (second turn around) cycle may be expected by the MDIO slave module 120. In some embodiments, the AHB read transfers may be started earlier in the read (or read-increment) cycle. In one example, the AHB read cycle may start immediately upon detection of a read or read-increment operation code (e.g., OP="11" or OP="10"). In another example, the AHB read cycle may start during or after reception of the physical address field PHYADR from the MDIO bus 112. In still another example, the AHB read cycle may start during or after reception of the register address field REGADR from the MDIO bus 112 and before the TA0 cycle.

The MDIO specification generally defines the signal MDIO_IO as a bidirectional, tri-state signal. If tri-stating is not implemented, an input signal (e.g., MDIO_IN) may be used as a received data signal and an output signal (e.g., MDIO_OUT) may be used as a transmitted data signal. An enable signal (e.g., MDIO_ENABLE) may be asserted whenever the signal MDIO_OUT signal would be driven as the signal MDIO_IO. The timing of transmitted data in the signal MDIO_OUT generally matches the timing in the MDIO specification.

The AHB master module 122 generally runs off the system clock signal SYS_CLK (e.g., 250 MHz). Since the AHB bus 114 may be approximately 20 to 100 times faster than the MDIO bus 112, an AHB read cycle generally takes place and the read data may be returned in time for the MDIO module 120 to respond to a read frame. As such, a latency of the AHB read transaction may be hidden from the MDIO bus 112.

Figure 4:
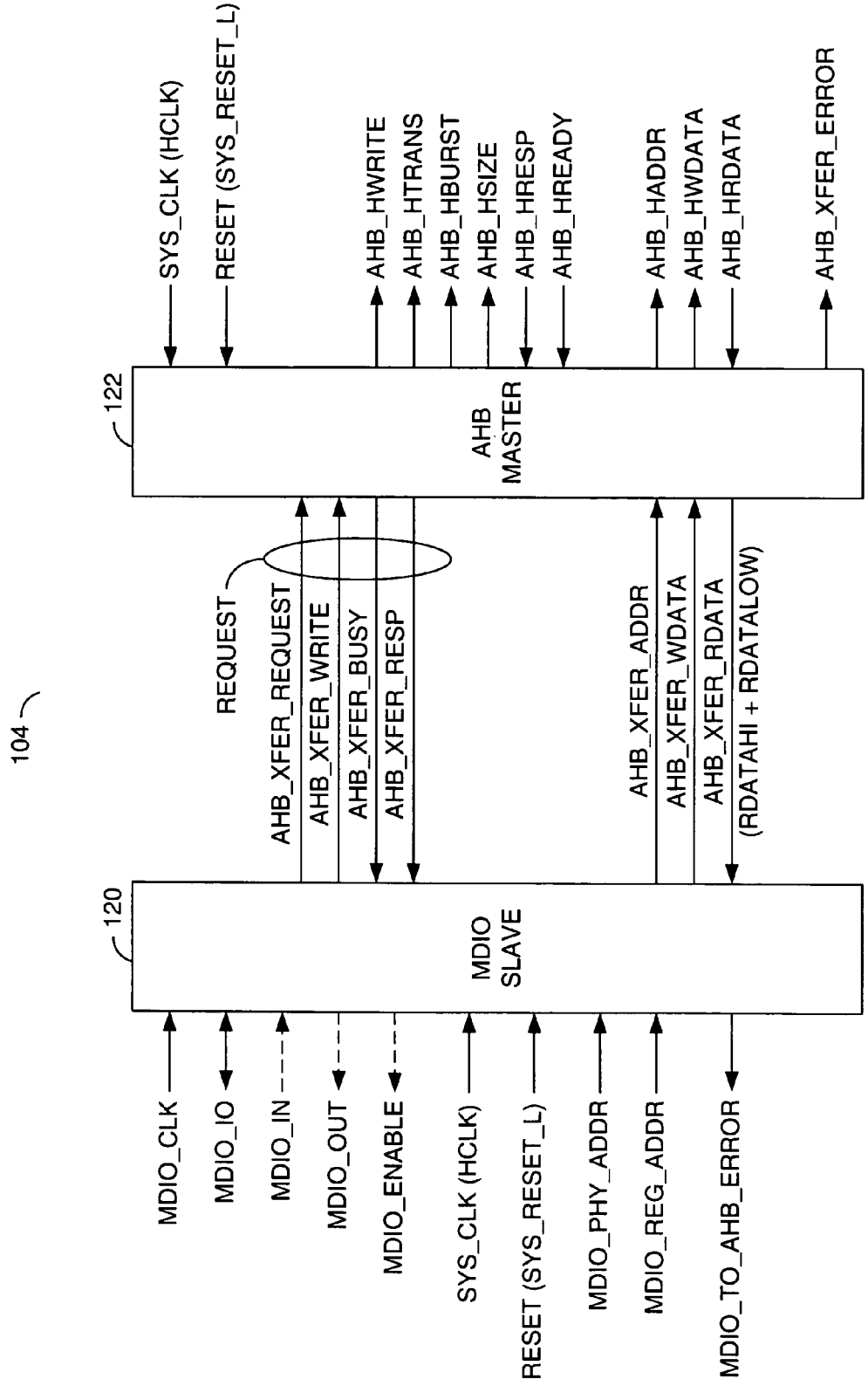
FIG. 4 is a block diagram illustrating signal details of the bridge circuit.

Referring to FIG. 4, a block diagram illustrating signal details of the bridge circuit 104 is shown. The ports of the MDIO module 120 generally comprise the following signals:

The signal SYS_CLK may be an input system clock signal. In one example, the signal SYS_CLK may be the same as an AHB bus clock signal (e.g., HCLK). In various embodiments, the signal SYS_CLK may have a frequency of approximately 50 MHz to 400 MHz.

The signal RESET may be a reset input signal. The signal RESET may also be called SYS_RESET_L (e.g., asserted in a logical low state).

The signal MDIO_TO_AHB_ERROR may be an output signal. The signal MDIO_TO_AHB_ERROR is generally asserted to indicate an error. Errors that may occur include, but are not limited to (i) an addressing error (e.g., a high word written without a low word previously written), (ii) an AHB read transfer did not complete in time to return the read data to the MDIO interface and (iii) the MDIO finite state machine somehow got into a "default" state. The default state may be exited by (A) a reset and/or (B) receiving an MDIO address value of 0xffff.

The signal MDIO_CLK may be an input clock signal. In various embodiments, the signal MDIO_CLK may have a frequency of approximately 2.5 MHz to 20 MHz.

The signal MDIO_IN may be an input data signal. The signal MDIO_IN may carry frames into the bridge circuit 104 from the STA circuit 102. In some embodiments (e.g., where tri-stating may be implemented), the signal MDIO_IN may be part of the signal MDIO_IO.

The signal MDIO_OUT may be output data signal. The signal MDIO_OUT may carry frames from the bridge circuit 104 to the STA circuit 102. In some embodiments (e.g., where tri-stating may be implemented), the signal MDIO_OUT may be part of the signal MDIO_IO.

The signal MDIO_IO may be a bidirectional data signal. The signal MDIO_IO may convey frames of information to/from the bridge circuit 104. The signal MDIO_IO may comprise the signals MDIO_IN and MDIO_OUT.

The signal MDIO_ENABLE may be an optional output signal. The signal MDIO_ENABLE may be asserted from one cycle before through one cycle after the signal MDIO_OUT is valid. The signal MDIO_ENABLE may be used to enable a tri-state driver to tie the signal MDIO_OUT and the signal MDIO_IN together externally (e.g., as in a traditional MDIO setup).

The signal MDIO_PHY_ADDR may be an input signal. The signal MDIO_PHY_ADDR generally carries a physical address value used to compare with the PHYADR field of an MDIO frame.

The signal MDIO_REG_ADDR may be an-input signal. The signal MDIO_REG_ADDR generally carries a value used to compare with the REGADR field of an MDIO frame.

The signal REQUEST may be a bidirectional signal. The signal REQUEST may transfer commands and information between the MDIO slave module 120 and the AHB master module 122. The signal REQUEST may be a top level grouping of other unidirectional and/or bidirectional signals.

A signal AHB_XFER_REQUEST may be an output signal. The signal AHB_XFER_REQUEST may be asserted to start an AHB master operation. The signal AHB_XFER_REQUEST may be a portion of the signal REQUEST.

A signal AHB_XFER_BUSY may be an input signal. The signal AHB_XFER_BUSY may be asserted by the AHB master module 122 while the AHB master module 122 is busy with an AHB transfer. The signal AHB_XFER_BUSY may be part of the signal REQUEST.

The signal AHB_XFER_ADDR may be an address output signal. The signal AHB_XFER_ADDR generally carries an address value from the MDIO slave module 120 to the AHB master module 122.

A signal AHB_XFER_WRITE may be an output signal. The signal AHB_XFER_WRITE may indicate a read or write operation. The signal AHB_XFER_WRITE may have a logical zero value to indicate a read and a logical one value of to indicate a write. The signal AHB_XFER_WRITE may be a part of the signal REQUEST.

A signal AHB_XFER_RDATA may be an input signal. The signal AHB_XFER_RDATA generally carries read data returned from an AHB read operation. The signal AHB_XFER_RDATA generally comprises the signal RDATAHI and the signal RDATALOW.

The signal AHB_XFER_WDATA may be an output signal. The signal AHB_XFER_WDATA generally carries write data for an AHB write operation. The signal AHB_XFER_WDATA may also be referred to as an AHB write data signal (e.g., AHB_HWDATA).

A signal AHB_XFER_RESP may be an optional input signal. The signal AHB_XFER_RESP generally indicates an AHB transfer response from the slave circuit 106a-106c involved in the transaction (e.g., read or write).

The ports of the AHB master module 122 generally comprise the following signals:

The signal SYS_CLK may be an input system clock. In one embodiment, the signal SYS_CLK may be the same as an AHB bus clock (e.g., HCLK).

The signal RESET may be a reset input signal. The signal RESET may also be referred to as the signal SYS_RESET_L.

The signal AHB_XFER_ERROR may be an output signal. The signal AHB_XFER_ERROR is generally asserted if an AHB error is reported in the response signal AHB_HRESP generated by one of the slave circuits 106a-106c.

The signal AHB_XFER_ADDR may be an input signal. The signal AHB_XFER_ADDR generally carries an address from the MDIO module 120 to the AHB master module 122.

The signal AHB_XFER_WRITE may be an input signal. The signal AHB_XFER_WRITE generally indicates if the AHB bus transaction is a read (e.g., 0=read) or a write (e.g., 1=write). The signal AHB_XFER_WRITE may be a portion of the signal REQEUST.

The signal AHB_XFER_WDATA may be an input signal. The signal AHB_XFER_WDATA generally carries write data for an AHB write operation.

The signal AHB_XFER_RDATA may be an output signal. The signal AHB_XFER_RDATA generally carries read data returned from an AHB read operation. The signal AHB_XFER_RDATA generally comprises the signal RDATAHI and the signal RDATALOW.

The signal REQUEST may be a bidirectional signal. The signal REQUEST may transfer commands and information between the MDIO slave module 120 and the AHB master module 122. The signal REQUEST may be a top level grouping of other unidirectional and/or bidirectional signals.

The signal AHB_XFER_REQUEST may be an input signal. The signal AHB_XFER_REQUEST may be asserted to start an AHB Master operation. The signal AHB_XFER_REQUEST may be a portion of the signal REQUEST.

The signal AHB_XFER_BUSY may be an output signal. The signal AHB_XFER_BUSY is generally asserted while the AHB master module 122 is busy with an AHB transfer. The signal AHB_XFER_BUSY may be part of the signal REQUEST.

The signal AHB_XFER_RESP may be an output signal. The signal AHB_XFER_RESP generally carries the AHB transfer response (e.g., either OKAY or ERROR) generated by the slave circuits 106a-106c. The signal AHB_XFER_RESP may be part of the signal REQUEST.

The signal AHB_HADDR may be an output signal. The signal AHB_HADDR may be attached to an HADDR port on each of the slave circuits 106a-106c. The address carried by the signal AHB_HADDR may be padded and adjusted by the AHB master module 122, as discussed above.

A signal AHB_HWRITE may be an output signal. The signal AHB_HWRITE is generally attached to an HWRITE port of each of the slave circuits 106a-106c.

A signal AHB_HTRANS may be an output signal. The signal AHB_HTRANS may be attached to an HTRANS port on each of the slave circuits 106a-106c.

A signal AHB_HBURST may be an output signal. The signal AHB_HBURST is generally attached to an HBURST port of each of the slave circuits 106a-106c.

A signal AHB_HSIZE may be an output signal. The signal ABH_HSIZE may be attached to an HSIZE port of each of the slave circuits 106a-106c.

The signal AHB_HWDATA may be an output signal. The signal AHB_HWDATA is generally attached to an HWDATA port of each of the slave circuits 106a-106c. The signal AHB_HWDATA may also be referred to as the signal AHB_XFER_WDATA.

The signal AHB_HRDATA may be an input signal. The signal AHB_HRDATA is generally attached to an HRDATA port of each of the slave circuits 106a-106c through the multiplexer 110c. The signal AHB_HRDATA may be one of the slave signals HRDATAa-HRDATAc.

The signal AHB_HREADY may be an input signal. The signal AHB_HREADY may be attached to an HREADY-OUT port of each of the slave circuits 106a-106c through the multiplexer 110a. The signal AHB_HREADY may be one of the slave signals HREADYa-HREADYc.

The signal AHB_HRESP may be an input signal. The signal AHB_HRESP generally indicates a status of the AHB bus transaction (e.g., OKAY or ERROR) from the slave circuits 106a-106c through the multiplexer 110b. The signal AHB_HRESP may be one of the slave response signals HRESPa-HRESPc.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s).

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for communicating between a first bus and a second bus, comprising the steps of:
   (A) recognizing a read operation code in a read frame (i) received from said first bus and (ii) communicated with a first-bus protocol;
   (B) initiating a read transaction on said second bus using a second-bus protocol different than said first-bus protocol, wherein said initiating occurs earlier than a turn around time in said first-bus protocol that provides a plurality of bit times to respond to said read operation code;
   (C) transmitting read data received from said second bus on said first bus immediately after said turn around time; and
   (D) truncating a bit width of an address received from said first bus.

2. The method according to claim 1, further comprising the step of:
   converting said read data received from said second bus in a parallel format to a serial format prior to transmission on said first bus.

3. The method according to claim 1, wherein said first bus is compliant with an Institute of Electrical and Electronics Engineering 802.3 standard and said second bus is compliant with an Advanced Microcontroller Bus Architecture specification.

4. The method according to claim 1, further comprising the step of:
   decoding a register address in said read frame earlier than said turn around time.

5. The method according to claim 4, further comprising the step of:
   decoding a physical address in said read frame later than said register address and earlier than said turn around time.

6. The method according to claim 5, further comprising the step of:
   continuing said read transaction in response to said physical address and said register address respectively matching an assigned physical address and an assigned register address.

7. The method according to claim 1, further comprising the step of:
   buffering an address received from said first bus in an address frame.

8. The method according to claim 7, wherein step (C) comprises the sub-steps of:
   transmitting a first portion of said read data on said first bus in response to a particular bit of said address having a first state; and
   transmitting a second portion of said read data on said first bus in response to said particular bit of said address having a second state different than said first state.

9. The method according to claim 1, further comprising the step of:
   buffering a first portion of a write data received from said first bus, without transferring said first portion to said second bus, in response to a particular bit of an address corresponding to said first portion of said write data having a first state.

10. The method according to claim 9, further comprising the step of:
    transferring both said first portion of said write data and a second portion of said write data on said second bus in response to said particular bit of said address having a second state opposite said first state.

11. A circuit comprising:
    a first module configured to (i) recognize a read operation code in a frame (a) received from a first bus and (b) communicated with a first-bus protocol, (ii) transmit read data received from a second bus on said first bus immediately after a turn around time in said first-bus protocol that provides a plurality of bit times to respond to said read operation code and (iii) buffer a first portion of a write data received from said first bus, without transferring said first portion to said second bus, in response to a particular bit of an address corresponding to said first portion having a first state; and
    a second module connected to said first module and configured to (i) initiate a read transaction on said second bus using a second-bus protocol different than said first-bus protocol, wherein said initiating occurs earlier than said turn around time in said first-bus protocol.

12. The circuit according to claim 11, wherein said first bus is compliant with an Institute of Electrical and Electronics Engineering 802.3 standard and said second bus is compliant with an Advanced Microcontroller Bus Architecture specification.

13. The circuit according to claim 11, wherein said first module comprises a first finite state machine configured to decode said frame.

14. The circuit according to claim 13, wherein said second module comprises a second finite state machine configured to communicate with a slave device on said second bus.

15. The circuit according to claim 14, wherein said first finite state machine is further configured to generate a request signal informing said second finite state machine to initiate said read transaction on said second bus.

16. The circuit according to claim 11, wherein said second module is further configured to expand a bit width of an address as received from said first module prior to use of said address on said second bus.

17. The circuit according to claim 11, wherein said first module further comprises a multiplex module configured to transfer a plurality of read portions of said read data from said second module one of said read portions at a time.

18. The circuit according to claim 17, wherein said multiplex module is further configured to transfer a plurality of write portions of a write data to said second module one of said write portions at a time.

19. A circuit comprising:
   means for recognizing a read operation code in a read frame (i) received from a first bus and (ii) communicated with a first-bus protocol;
   means for initiating a read transaction to a device on a second bus using a second-bus protocol different than said first-bus protocol, wherein said initiating occurs earlier than a turn around time in said first-bus protocol that provides a plurality of bit times to respond to said read operation code;
   means for transmitting read data received from said second bus on said first bus immediately after said turn around time; and
   means for buffering a first portion of a write data received from said first bus, without transferring said first portion to said second bus, in response to a particular bit of an address corresponding to said first portion having a first state.

20. The circuit according to claim 19, further comprising means for truncating a bit width of said address as received from said first bus.

21. A method for communicating between a first bus and a second bus, comprising the steps of:
   (A) recognizing a read operation code in a read frame (i) received from said first bus and (ii) communicated with a first-bus protocol;
   (B) initiating a read transaction on said second bus using a second-bus protocol different than said first-bus protocol, wherein said initiating occurs earlier than a turn around time in said first-bus protocol that provides a plurality of bit times to respond to said read operation code;
   (C) transmitting read data received from said second bus on said first bus immediately after said turn around time;
   (D) buffering an address received from said first bus in an address frame; and
   (E) buffering a first portion of a write data received from said first bus, without transferring said first portion to said second bus, in response to a particular bit of said address having a first state.

22. A circuit comprising:
   a first module configured to (i) recognize a read operation code in a frame (a) received from a first bus and (b) communicated with a first-bus protocol, (ii) transmit read data received from a second bus on said first bus immediately after a turn around time in said first-bus protocol that provides a plurality of bit times to respond to said read operation code and (iii) truncate a bit width of an address received from said first bus; and
   a second module connected to said first module and configured to (i) initiate a read transaction on said second bus using a second-bus protocol different than said first-bus protocol, wherein said initiating occurs earlier than said turn around time in said first-bus protocol.

* * * * *